United States Patent [19]

Josten et al.

[11] 4,011,280

[45] Mar. 8, 1977

[54] PROCESS FOR THE PRODUCTION OF BINDERS FOR WEATHER-PROOF WOOD MATERIALS AND PRODUCT

[75] Inventors: Friedrich Josten, Rheinkamp-Utfort; Martin Cherubim, Rheinkamp-Eick, both of Germany

[73] Assignee: Deutsche Texaco Aktiengesellschaft, Hamburg, Germany

[22] Filed: Dec. 6, 1974

[21] Appl. No.: 530,477

[30] Foreign Application Priority Data

Dec. 21, 1973 Germany .......................... 2363797

[52] U.S. Cl. ................................. 260/828; 260/50; 428/529

[51] Int. Cl.² .................. C08L 61/00; C08L 61/34; C08G 8/26

[58] Field of Search ............................. 260/828, 50

[56] References Cited

UNITED STATES PATENTS

| | | | |
|---|---|---|---|
| 2,206,906 | 7/1940 | Loos | 260/828 |
| 2,545,559 | 3/1951 | Schrimpe | 260/828 |
| 2,629,703 | 2/1953 | Vogelsang | 260/828 |
| 2,634,249 | 4/1953 | Vogelsang | 260/828 |
| 3,006,883 | 10/1961 | Cambron | 260/828 |

FOREIGN PATENTS OR APPLICATIONS

| | | | |
|---|---|---|---|
| 46,032 | 6/1962 | Poland | 260/50 |

*Primary Examiner*—John C. Bleutge
*Attorney, Agent, or Firm*—T. H. Whaley; C. G. Ries; Robert A. Kulason

[57] ABSTRACT

Improved resin solutions derived from phenol-acetone-formaldehyde co-condensates useful as binder in weather-proof wood materials and a process for the production of said solutions.

14 Claims, No Drawings

PROCESS FOR THE PRODUCTION OF BINDERS FOR WEATHER-PROOF WOOD MATERIALS AND PRODUCT

BACKGROUND OF INVENTION

It is known to employ urea-formaldehyde/melamine formaldehyde resin solutions, and mixtures thereof, as binders for wood materials, such as chip boards, wood fiber boards, plywood etc. Although the urea-formaldehyde/melamine-formaldehyde resins are effective binders for wood, they have the great disadvantage in that they are unstable for a long period of time after treatment of the wood materials resulting in noxious formaldehyde odor and bound wood materials which do not give resistance to weather as required by German Industrial Standards (DIN) No. 68,761.

On the other hand, phenol-formaldehyde resin solutions have the great advantage of emitting essentially no formaldehyde and always meet the required weather resistance (DIN 68,761). However, the disadvantages of phenolic resins are their dark color and free phenol content of at least 10 ppm which introduces an unpleasant factor in working up the wood materials. In regard to the phenol content, the grinding dust of phenol-formaldehyde treated wood material containing, e.g., 10 to 12 ppm free phenol deleteriously affects skin and respiratory organs and this is principally attributed to the free phenol. The phenol-formaldehyde resins have the added disadvantage of being relatively more costly than many of the alternative resins such as urea-formaldehyde/melamine resins.

In respect to still other binders for wood materials, e.g., molding materials, U.S. Pat. Nos. 2,629,703 and 2,634,249 teach binders obtained by co-condensing phenolic and ketonic formaldehyde resin solutions wherein the ketonic formaldehyde resins are present in the proportion of from 50 to 95 percent, preferably from 70 to 90 percent by weight.

Still further, according to French Pat. No. 1,270,535, a binder for thermosetting laminates is obtained by first condensing acetone with formaldehyde in alkaline solution and then producing a co-condensate by adding phenol and further amounts of formaldehyde thereto. Unfortunately, the wood materials produced with these phenol-ketone-formaldehyde resin solutions, although avoiding many of the aforementioned disadvantages associated with other binders, do not have the weather resistance required by DIN Standards No. 68,761. Further, the storage stability of these phenol-ketone-formaldehyde co-condensates is unsatisfactory.

One object of the invention is to provide a process and resulting product therefrom wherein the aforementioned disadvantages of the phenol-ketone-formaldehyde binders can be avoided.

SUMMARY OF THE INVENTION

We have discovered and this constitutes our invention a process and resultant product, said process producing phenol-acetone-formaldehyde co-condensates having good storage stability, containing reduced amounts of free phenol, and when used as binders for wood materials meet the weather resistance for materials as required by DIN Standards No. 68,761.

DETAILED DESCRIPTION OF THE INVENTION

The process of the invention comprises as a first step condensing phenol and formaldehyde in a mole ratio of between 1:1.5 and 1:5 in the presence of 0.01 to 1 mole of alkali metal hydroxide based on the phenol, for a period of 0.3 to 10 hours at a temperature ranging between 40° and 100° C. to obtain an intermediate condensate product of a viscosity (basis DIN Standards No. 53,211) of from about 10 to 20 seconds measured at 20° C. in a 4 mm DIN Standards flow cup, and subsequently as a second step adding to the resultant intermediate condensate from 0.1 to 1 mole, based on the phenol, of acetone, from 2 to 6 moles, based on the acetone, of formaldehyde, and from 0 to 1 mole, based on phenol plus acetone, of alkali hydroxide, and continuing the condensation reaction at a temperature ranging from 40° to 100° C. until having obtained a final condensate having a solids content of from 40 to 50 wt. % determined after heating for two hours to 120° C. and a viscosity of from 20 to 200 seconds measured at 20° C. in the 4 mm DIN Standards flow cup.

The total mole ratio of phenol plus acetone to formaldehyde shall be in the range of between 1:2 and 1:4, preferably in the range of between 1:3 and 1:3.5.

It is important to perform the co-condensation such that first step phenol-formaldehyde condensation is conducted in an alkaline medium followed by further adding acetone and formaldehyde and completing their condensation to form the phenolic resin.

The portion of acetone used in the second stage of the process must be kept in the range of from 0.1 to 1 mole of acetone per mole of phenol. Specifically, it is necessary not to exceed the 1:1 mole ratio of acetone:-phenol in order to form the binders for wood materials according to the invention which will result in bound wood materials having the resistance to hot water of at least 1.5 kp/sq.cm. basis V 100 of DIN Standards No. 52, 365. The resistance to hot water of wood materials is a measure for their weather resistance to DIN Standards No. 68,761.

The phenol reactant may be employed in the form of pure phenol, as well as in the form of aqueous or aqueous-alkaline solution, or in admixture with an aqueous formaldehyde solution. Further, it may also be partially replaced, i.e., up to about 50 wt. % by alkylated phenol derivatives, for example, o-cresol, m-cresol, p-cresol, and polyhydroxy benzene such as resorcinol.

The formaldehyde reactant may be employed in the form of para-formaldehyde or in an aqueous 30–42 wt. % solution.

The alkali metal hydroxide may be added to the mixture in solid form or as an aqueous solution. Any of the alkali metal hydroxides are suitable, sodium hydroxide is preferred. The alkali metal hydroxide may be added entirely at the beginning of the condensation reaction (first stage) or gradually during both stages of the condensation reaction. Although not absolutely required, the addition of alkali metal hydroxide in the second stage is of great advantage in enhancing the desirable properties of the resultant resin solutions in respect to their use as binders for wood materials.

Under preferred conditions, it is desirable to conduct the second stage of the process until there is initially obtained a viscosity higher than desired, then to reduce the temperature to below 65° C. and, subsequently, to adjust the viscosity desired by adding up to 1.5 moles, based on phenol plus acetone, of alkali metal hydroxide.

The wood materials produced with the phenol-acetone-formaldehyde resin product according to the invention have a reduced free phenol content of as little as from 0 to 5 ppm and as heretofore indicated, have the resistance to hot water and to weather, respectively, as required.

The solutions of binders produced according to the invention distinguish themselves by their considerably improved storage life.

The process, resultant product and use thereof, are further described in the following examples, but they are not to be considered as limitations thereof.

EXAMPLE 1

This example illustrates the process and product of the invention.

To a 4-liter vessel equipped with a stirrer, a reflux condenser and a thermometer, there was charged 527 grams of phenol (5.6 moles) and 908 grams of a 37 wt. % aqueous formaldehyde solution (11.2 moles). The resultant mixture was heated under stirring to a temperature of 60° C. and 128 grams of a 50 wt. % aqueous sodium hydroxide solution (1.6 moles) were added dropwise over a 75 minute period. After having continued the condensation reaction for 15 minutes at a temperature of 60° C., a pre-condensate of phenol and formaldehyde with a viscosity of 15 seconds, measured at 20° C. in a 4 mm DIN Standards flow cup, was formed. To said precondensate, 139 grams of acetone (2.4 moles) and 1090 grams of a 37 wt. % aqueous formaldehyde solution (13.4 moles) were added followed by adding dropwise within 45 minutes, 96 grams of a 50 wt. % aqueous sodium hydroxide solution (1.2 moles). The temperature was increased to 85° C. and the condensation reaction was continued until a viscosity of 130 seconds (DIN 53,211) was attained. Thereafter, the temperature was reduced to 64° C. and an additional 448 grams of a 50 wt. % aqueous sodium hydroxide solution were added resulting in a viscosity decrease to 60 seconds.

The analysis of the condensation products so obtained read as follows:

| | |
|---|---|
| Solids content, wt. % | 45.2 |
| Viscosity (DIN Standards No. 53,211), seconds | 60 |
| Free phenol content, wt. % | 0.10 |
| Free formaldehyde content, wt. % | 0.15 |
| Free NaOH contnt, wt. % | 8.2 |
| Gelling time (minutes at 100° C.) | 36 |
| Hardening time (seconds at 130° C. on the Duro test board)* | 52 |

*In this test, the resin is being stirred with a bar at 130° C. and the time is counted which was needed for the meltable or liquid state of the resin to change to the state where the resin no longer sticks to the bar or can easily be scraped off.

The viscosity of the final condensation resin solution increased within 4-weeks time by only 6 seconds.

EXAMPLE 2

This example further illustrates the process and product of the invention.

To a 6 liter vessel equipped with a stirrer, a reflux condenser, and with a thermometer, 451.7 grams of phenol (4.8 moles) and 908 grams of a 37 wt. % aqueous formaldehyde solution (11.2 moles) were charged and the resultant mixture was heated to a temperature of 60° C. whereupon at this temperature there was added over a 75 minute period 128 grams of a 50 wt. % aqueous sodium hydroxide solution (1.6 moles). The condensation reaction was continued at this 60° C. temperature until a reaction mixture viscosity of 18 seconds was attained. Then 185.8 grams of acetone (3.2 moles) and 1219.7 grams of a 38 wt. % aqueous formaldehyde solution (15.1 moles) were added to the condensate, and thereafter, an additional 96 grams of a 50 wt. % aqueous sodium hydroxide solution (1.2 moles) were added over a 45 minute period. The resultant mixture was heated within 20 minutes to a temperature of 75° C. and condensed by maintaining the said temperature until a viscosity of 75 seconds was attained. Thereupon, the temperature was reduced to 60° C. The viscosity was adjusted to 35 seconds by adding 448 grams of a 50 wt. % aqueous sodium hydroxide solution (5.6 moles).

The analysis of the condensation resin solution was as follows:

| | |
|---|---|
| Solids content, wt. % | 43.5 |
| Viscosity (DIN 53,211), seconds | 35 |
| Free phenol content, wt. % | 0.08 |
| Free formaldehyde content, wt. % | 0.20 |
| Free NaOH content, wt. % | 3.8 |
| Gelling time (minutes at 100° C.) | 53 |
| Hardening time (minutes at 130° C. on the Duro test board) | 52 |

The viscosity of the resin solution increases within a 4-weeks time by only eight seconds.

EXAMPLE 3

This example illustrates a comparative process and resultant comparative product.

To an apparatus as described in Examples and 2, there was charged 451.7 grams of phenol (4.8 moles), 2128 grams of a 37 wt. % aqueous formaldehyde solution (26.24 moles) and 185.8 grams of acetone (3.2 moles). The resultant charge was admixed and heated in a stirring apparatus of the type described in Examples 1 and 2 to a temperature of 60° C. At this temperature, 224 grams of a 50 wt. % aqueous sodium hydroxide solution (2.8 moles) were added dropwise to the mixture within 75 minutes. Subsequently, the mixture was maintained at the temperature of 60° C. for further 15 minutes, thereafter heated over a period of 20 minutes to a temperature of 75° C. at this temperature until a viscosity of 80 seconds was attained. Thereupon, the condensation resin solution was cooled to 50° C. and 448 grams of a 50 wt. % aqueous sodium hydroxide solution (5.6 moles) were further added thereto.

The resin solution obtained had the following properties:

| | |
|---|---|
| Solids content, wt. % | 43.6 |
| Viscosity (DIN 53,211, seconds) | 37 |
| Free phenol content, wt. % | 0.21 |
| Free formaldehyde, wt. % | 0.10 |
| Free NaOH content, wt. % | 7.7 |
| Gelling time, (minutes at 100° C.) | 52 |
| Hardening time (minutes at 130° C. on the Duro test board) | 50 |

The final resin solution has a storage life of 3 weeks or less.

EXAMPLE 4

This example further illustrates another comparative process and resultant comparative product.

In a 4 liter stirring apparatus, 527 grams of phenol (5.6 moles) and 908 grams of a 38 wt. % aqueous formaldehyde solution (11.2 moles) were admixed, heated to a temperature of 60° C. whereupon during a 75 minute period 128 grams of a 50 wt. % aqueous sodium solution (1.6 moles NaOH) at the temperature of 60° C. were added and the resultant mixture was maintained at 60° C. for 15 minutes during this post-condensation period until a viscosity of 18 seconds was reached. The resultant resin solution was designated as Resin Solution A.

In a separate process, an acetone-formaldehyde resin having a viscosity of 12 seconds was produced from 1 mole of acetone and 2 moles of formaldehyde in the presence of 0.1 mole of NaOH. The resultant resin solution was designated as Resin Solution B.

Resin Solutions A and B were mixed together by pouring Resin Solution B into Resin Solution A. The resultant mixture was subjected to post-condensation at a temperature of 85° C. for 110 minutes, cooled to 50° C., admixed over a period of 10 minutes with 448 grams of a 50 wt. % aqueous sodium solution, and adjusted to a solids content of 47.9 wt. % by adding water thereto.

The co-condensate so obtained had the following properties:

| | |
|---|---|
| Solids content, wt. % | 47.9 |
| Viscosity (DIN 53,211, seconds) | 63 |
| Free phenol content, wt. % | 0.10 |
| Free formaldehyde content, wt. % | < 0.2 |
| Free NaOH content, wt. % | 10.8 |
| Gelling time (minutes at 100° C.) | 51 |
| Hardening time (seconds at 130° C. on the Duro test board) | 54 |

The co-condensate solution had a storage life of from 1 to 2 weeks.

EXAMPLE 5

This example illustrates use of the resins of the invention as binders for wood products and their superiority as binders to comparative binders manufactured by comparative processes.

Chip boards were produced employing the representative resin solutions of Examples 1 and 2 and comparative Solutions A and B of Example 4. The conditions under which the resin treated chip boards were produced, are summarized in Table I and the test results are summarized in Table II.

TABLE I

| | |
|---|---|
| Glueing factor (wt. % resin (dry basis) Based on the amount of wood used (dry basis) | 9 |
| Hydrophobizing | 1 wt. % hardener based (dry basis) based on resinic solids |
| Accelerator | 4% hardener based on resin solution |
| Molding temperature | 160 to 165° C. |
| Molding time | 5.7 minutes |
| Molding pressure | 22 kp/sq.cm |
| Molding factor (molding time per mm thickness of plate) | 0.30 min./mm |

TABLE II

| Test Description | Resin Source Ex. 1 | Ex. 2 | A Ex. 4 | B Ex. 4 |
|---|---|---|---|---|
| Thickness of plate, mm | 19 | 19 | 19 | 19 |
| Specific gravity, gram/cbcm | 0.667 | 0.657 | 0.661 | 0.670 |
| Flexural strength acc. to DIN Standards No. 52, 362, kp/sq.cm | 172 | 165 | 160 | 167 |
| Tensile strength V 20, perpendicular to plate, kp/sq.cm, acc. to DIN Standards No. 52, 365 (V 20: no pretreatment) | 6.4 | 4.3 | 3.3 | 4.4 |
| Tensile strength V 100, perpendicular to plate, kp/sq.cm, acc. to DIN Standards No. 52, 365 (V 100: 2-hour storage in boiling water - pretreatment) | 2.4 | 1.8 | 0.9 | 1.3 |
| Swelling in vertical direction after 24 hrs. acc. to DIN Standards No. 52, 364 (col. %) | 3.1 | 2.7 | 3.4 | 5.3 |
| Swelling in vertical direction after 24 hrs. acc. to DIN Standards N0. 52,364 (vol. %) | 9.9 | 10.6 | 10.7 | 12.8 |

As shown by Table II, the wood chip boards produced with the representative resin solutions of Examples 1 and 2 of the invention attained the tensile strength V 100 of 1.5 kp/sq.cm as required by DIN Standards No. 68,761 where the comparative resins of Example 4 (A and B) do not.

We claim:

1. A process for the production of binders derived from phenol-acetone-formaldehyde co-condensates, for use in weather-proof wood materials consisting essentially of as a first step condensing phenol and formaldehyde in a mole ratio of between 1:1.5 and 1:5 in the presence of from 0.1 to 1 mole of alkali hydroxide, based on phenol, at a temperature of from 40° to 100° C. to obtain a precondensate of a viscosity of from about 10 to 20 seconds measured at 20° C. in the 4 mm DIN Standards flow cup and subsequently, in the second step, adding to this precondensate from 0.1 to 1 mole, based on phenol, of acetone, 2 to 6 moles based on acetone, of formaldehyde and 0 to 1 mole of alkali metal hydroxide, based on phenol plus acetone, and continuing the condensation reaction at 40° to 100° C. until having obtained, for a solids content of from 40 to 50 percent, a viscosity of from 20 to 200 seconds measured at 20° C. in the 4 mm DIN Standards flow cup.

2. A process according to claim 1 characterized by selecting the mole ratio of phenol and acetone to formaldehyde in the range of between 1:2 and 1:4.

3. A process according to claim 1 characterized by selecting the mole ratio of phenol and acetone to formaldehyde in the range of between 1:3 and 1:3.5.

4. A process according to claim 1 wherein the phenol reactant consists of up to 50 wt. % of a member selected from the group consisting of o-cresol, m-cresol, p-cresol and resorcinol.

5. A process according to claim 2 characterized by initially conducting the second step to a higher viscosity than finally desired, then reducing the temperature to below 65° C. and, subsequently, adjusting to the desired viscosity by the addition of up to 1.5 moles, based on phenol plus acetone, of alkali metal hydroxide.

6. A process according to claim 2 wherein said alkali metal hydroxide is sodium hydroxide.

7. A process according to claim 4 wherein said alkali metal hydroxide is sodium hydroxide.

8. The product of the process of claim 1.

9. The product of the process of claim 2.

10. The product of the process of claim 3.

11. The product of the process of claim 4.

12. The product of the process of claim 5.

13. The product of the process of claim 6.

14. The product of the process of claim 7.

* * * * *